US012574197B2

(12) United States Patent
Zhou et al.

(10) Patent No.: US 12,574,197 B2
(45) Date of Patent: Mar. 10, 2026

(54) DYNAMIC SWITCHING BETWEEN SUB-BAND FULL DUPLEX CONFIGURATIONS

(71) Applicant: QUALCOMM Incorporated, San Diego, CA (US)

(72) Inventors: Yan Zhou, San Diego, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 443 days.

(21) Appl. No.: 18/173,531

(22) Filed: Feb. 23, 2023

(65) Prior Publication Data

US 2024/0291630 A1     Aug. 29, 2024

(51) Int. Cl.
H04L 5/14 (2006.01)
H04W 72/23 (2023.01)

(52) U.S. Cl.
CPC .............. H04L 5/14 (2013.01); H04W 72/23 (2023.01)

(58) Field of Classification Search
None
See application file for complete search history.

(56) References Cited

U.S. PATENT DOCUMENTS

| | | | | | |
|---|---|---|---|---|---|
| 2009/0296609 | A1* | 12/2009 | Choi | .......................... | H04L 5/14 370/281 |
| 2012/0207038 | A1* | 8/2012 | Choi | ..................... | H04W 16/14 455/67.11 |
| 2021/0112429 | A1* | 4/2021 | Raghavan | .............. | H04L 5/1461 |
| 2021/0360670 | A1* | 11/2021 | Huang | ............... | H04W 72/1273 |
| 2021/0377926 | A1* | 12/2021 | Li | ........................... | H04L 5/0053 |
| 2023/0292294 | A1* | 9/2023 | Rudolf | ................... | H04L 5/0053 |
| 2024/0063992 | A1* | 2/2024 | Esswie | ............... | H04W 72/1273 |
| 2024/0064717 | A1* | 2/2024 | Yoshimura | .............. | H04W 8/24 |
| 2024/0097866 | A1* | 3/2024 | Nemeth | ................. | H04L 5/1469 |
| 2024/0107525 | A1* | 3/2024 | Khan Beigi | .......... | H04L 5/1469 |
| 2024/0114374 | A1* | 4/2024 | Chege | ................... | H04W 24/10 |

FOREIGN PATENT DOCUMENTS

| | | |
|---|---|---|
| WO | WO-2022178749 | 9/2022 |
| WO | WO-2022183914 | 9/2022 |
| WO | WO-2022245475 | 11/2022 |

OTHER PUBLICATIONS

International Search Report and Written Opinion—PCT/US2024/013088—ISA/EPO—May 31, 2024.

* cited by examiner

*Primary Examiner* — Clemence S Han
(74) *Attorney, Agent, or Firm* — Harrity & Harrity, LLP

(57)     ABSTRACT

Various aspects of the present disclosure generally relate to wireless communication. In some aspects, a user equipment (UE) may receive, from a network node, information identifying a sub-band full duplex (SBFD) pattern, wherein the information identifying the SBFD pattern includes an indicator of whether the SBFD pattern is for a UE SBFD mode or a network node SBFD mode. The UE may communicate, with the network node, on one or more sub-bands in accordance with the SBFD pattern and the indicator of whether the SBFD pattern is for the UE SBFD mode or the network node SBFD mode. Numerous other aspects are described.

30 Claims, 12 Drawing Sheets

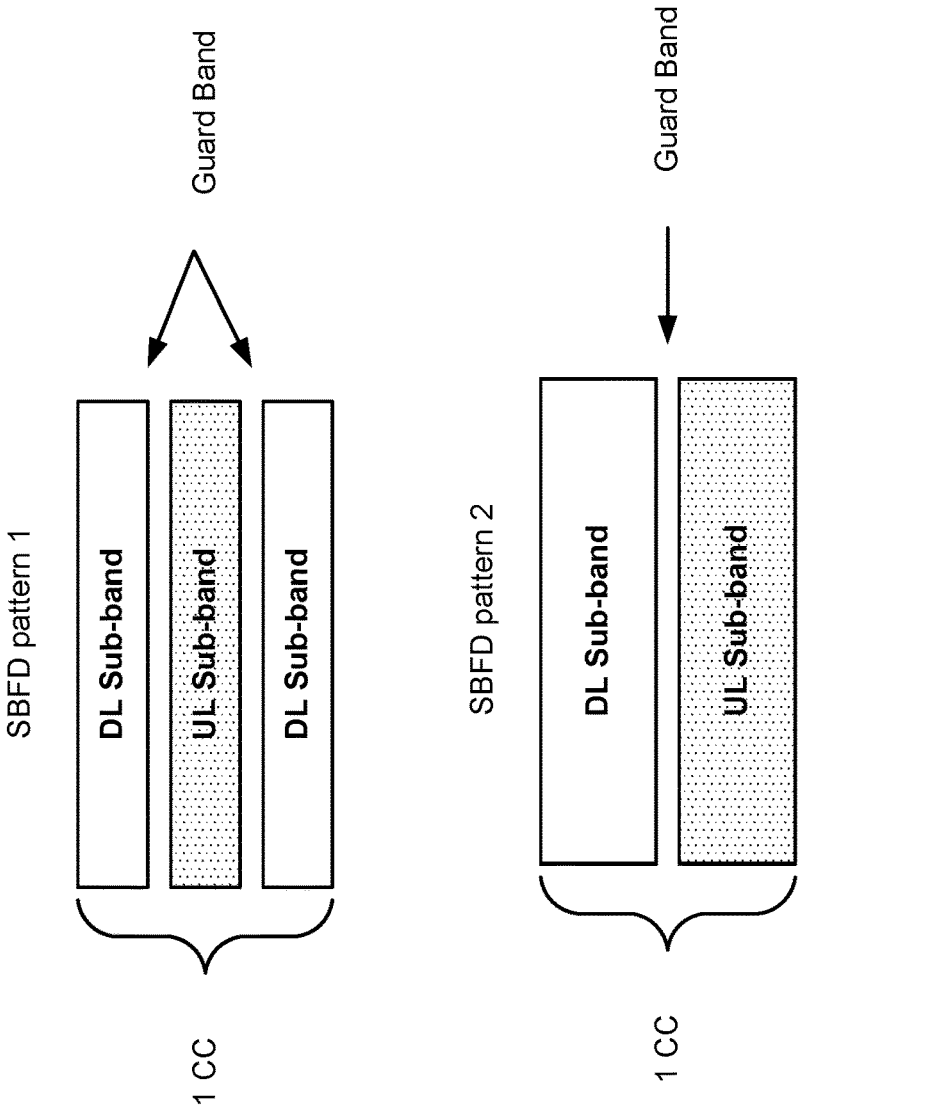
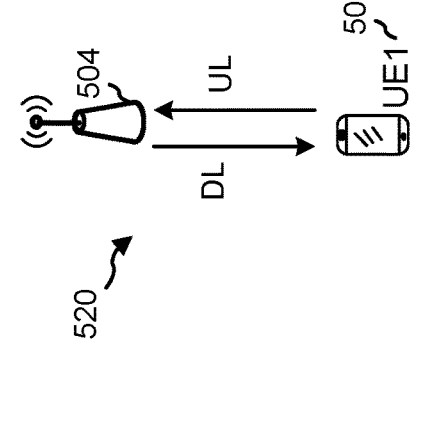
FIG. 5E

610: UE capability information

620: Static configuration information

630: UE request

640: Dynamic configuration information

SBFD operation in accordance with dynamic configuration information

650

Network Node 110

UE 120

600

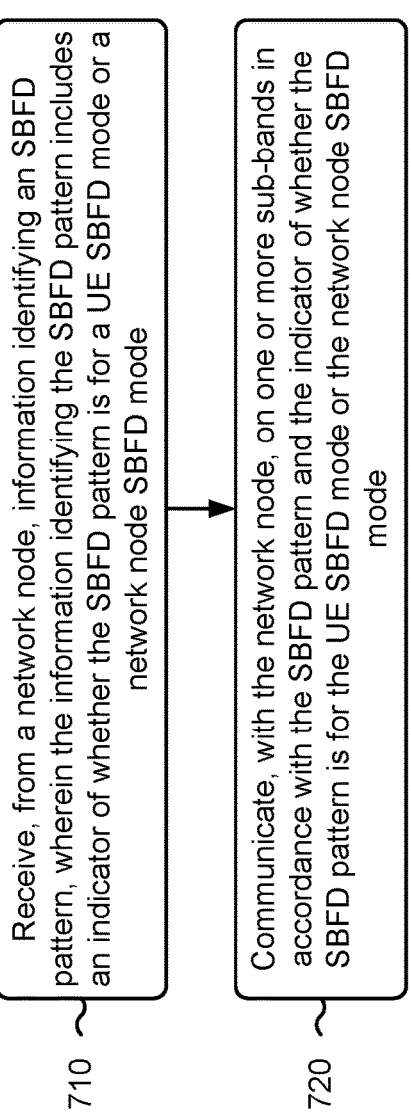

710  Receive, from a network node, information identifying an SBFD pattern, wherein the information identifying the SBFD pattern includes an indicator of whether the SBFD pattern is for a UE SBFD mode or a network node SBFD mode 720  Communicate, with the network node, on one or more sub-bands in accordance with the SBFD pattern and the indicator of whether the SBFD pattern is for the UE SBFD mode or the network node SBFD mode

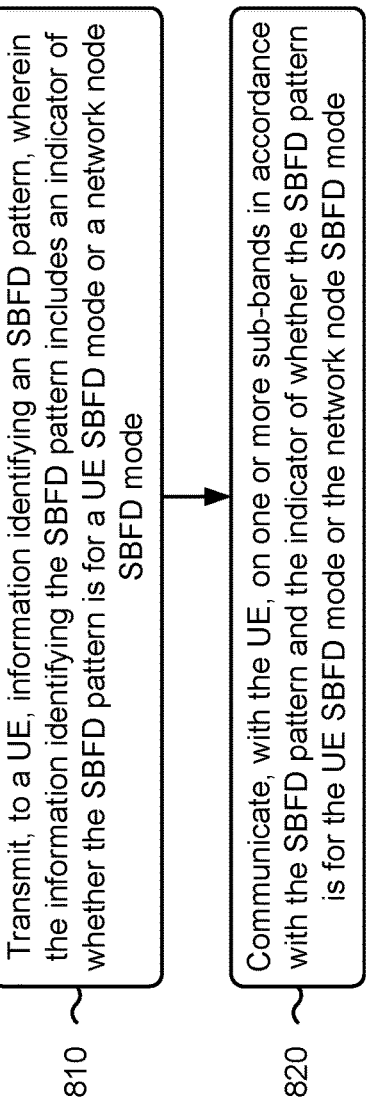

800

810   Transmit, to a UE, information identifying an SBFD pattern, wherein the information identifying the SBFD pattern includes an indicator of whether the SBFD pattern is for a UE SBFD mode or a network node SBFD mode 820   Communicate, with the UE, on one or more sub-bands in accordance with the SBFD pattern and the indicator of whether the SBFD pattern is for the UE SBFD mode or the network node SBFD mode

FIG. 8

Reception Component 902

Communication Manager 906

Transmission Component 904

908

900

DYNAMIC SWITCHING BETWEEN SUB-BAND FULL DUPLEX CONFIGURATIONS

FIELD OF THE DISCLOSURE

Aspects of the present disclosure generally relate to wireless communication and to techniques and apparatuses for dynamic switching between sub-band full duplex configurations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, information identifying a sub-band full duplex (SBFD) pattern, wherein the information identifying the SBFD pattern includes an indicator of whether the SBFD pattern is for a UE SBFD mode or a network node SBFD mode. The method may include communicating, with the network node, on one or more sub-bands in accordance with the SBFD pattern and the indicator of whether the SBFD pattern is for the UE SBFD mode or the network node SBFD mode.

Some aspects described herein relate to a method of wireless communication performed by a network node. The method may include transmitting, to a UE, information identifying an SBFD pattern, wherein the information identifying the SBFD pattern includes an indicator of whether the SBFD pattern is for a UE SBFD mode or a network node SBFD mode. The method may include communicating, with the UE, on one or more sub-bands in accordance with the SBFD pattern and the indicator of whether the SBFD pattern is for the UE SBFD mode or the network node SBFD mode.

Some aspects described herein relate to a UE for wireless communication. The UE may include a memory and one or more processors coupled to the memory. The one or more processors may be configured to receive, from a network node, information identifying an SBFD pattern, wherein the information identifying the SBFD pattern includes an indicator of whether the SBFD pattern is for a UE SBFD mode or a network node SBFD mode. The one or more processors may be configured to communicate, with the network node, on one or more sub-bands in accordance with the SBFD pattern and the indicator of whether the SBFD pattern is for the UE SBFD mode or the network node SBFD mode.

Some aspects described herein relate to a network node for wireless communication. The network node may include a memory and one or more processors coupled to the memory. The one or more processors may be configured to transmit, to a UE, information identifying an SBFD pattern, wherein the information identifying the SBFD pattern includes an indicator of whether the SBFD pattern is for a UE SBFD mode or a network node SBFD mode. The one or more processors may be configured to communicate, with the UE, on one or more sub-bands in accordance with the SBFD pattern and the indicator of whether the SBFD pattern is for the UE SBFD mode or the network node SBFD mode.

Some aspects described herein relate to a non-transitory computer-readable medium that stores a set of instructions for wireless communication by a UE. The set of instructions, when executed by one or more processors of the UE, may cause the UE to receive, from a network node, information identifying an SBFD pattern, wherein the information identifying the SBFD pattern includes an indicator of whether the SBFD pattern is for a UE SBFD mode or a network node SBFD mode. The set of instructions, when executed by one or more processors of the UE, may cause the UE to communicate, with the network node, on one or more sub-bands in accordance with the SBFD pattern and the indicator of whether the SBFD pattern is for the UE SBFD mode or the network node SBFD mode.

Some aspects described herein relate to a non-transitory computer-readable medium that stores a set of instructions for wireless communication by a network node. The set of instructions, when executed by one or more processors of the network node, may cause the network node to transmit, to a UE, information identifying an SBFD pattern, wherein the information identifying the SBFD pattern includes an indicator of whether the SBFD pattern is for a UE SBFD mode or a network node SBFD mode. The set of instructions, when executed by one or more processors of the network node, may cause the network node to communicate, with the UE, on one or more sub-bands in accordance with the SBFD pattern and the indicator of whether the SBFD pattern is for the UE SBFD mode or the network node SBFD mode.

Some aspects described herein relate to an apparatus for wireless communication. The apparatus may include means for receiving, from a network node, information identifying an SBFD pattern, wherein the information identifying the SBFD pattern includes an indicator of whether the SBFD pattern is for a UE SBFD mode or a network node SBFD mode. The apparatus may include means for communicating, with the network node, on one or more sub-bands in accordance with the SBFD pattern and the indicator of whether the SBFD pattern is for the UE SBFD mode or the network node SBFD mode.

Some aspects described herein relate to an apparatus for wireless communication. The apparatus may include means for transmitting, to a UE, information identifying an SBFD pattern, wherein the information identifying the SBFD pattern includes an indicator of whether the SBFD pattern is for a UE SBFD mode or a network node SBFD mode. The apparatus may include means for communicating, with the UE, on one or more sub-bands in accordance with the SBFD pattern and the indicator of whether the SBFD pattern is for the UE SBFD mode or the network node SBFD mode.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5E are diagrams illustrating examples of duplex communication in accordance with the present disclosure.

FIG. 7 is a diagram illustrating an example process performed, for example, by a UE, in accordance with the present disclosure.

FIG. 8 is a diagram illustrating an example process performed, for example, by a network node, in accordance with the present disclosure.

DETAILED DESCRIPTION

Figure 1:
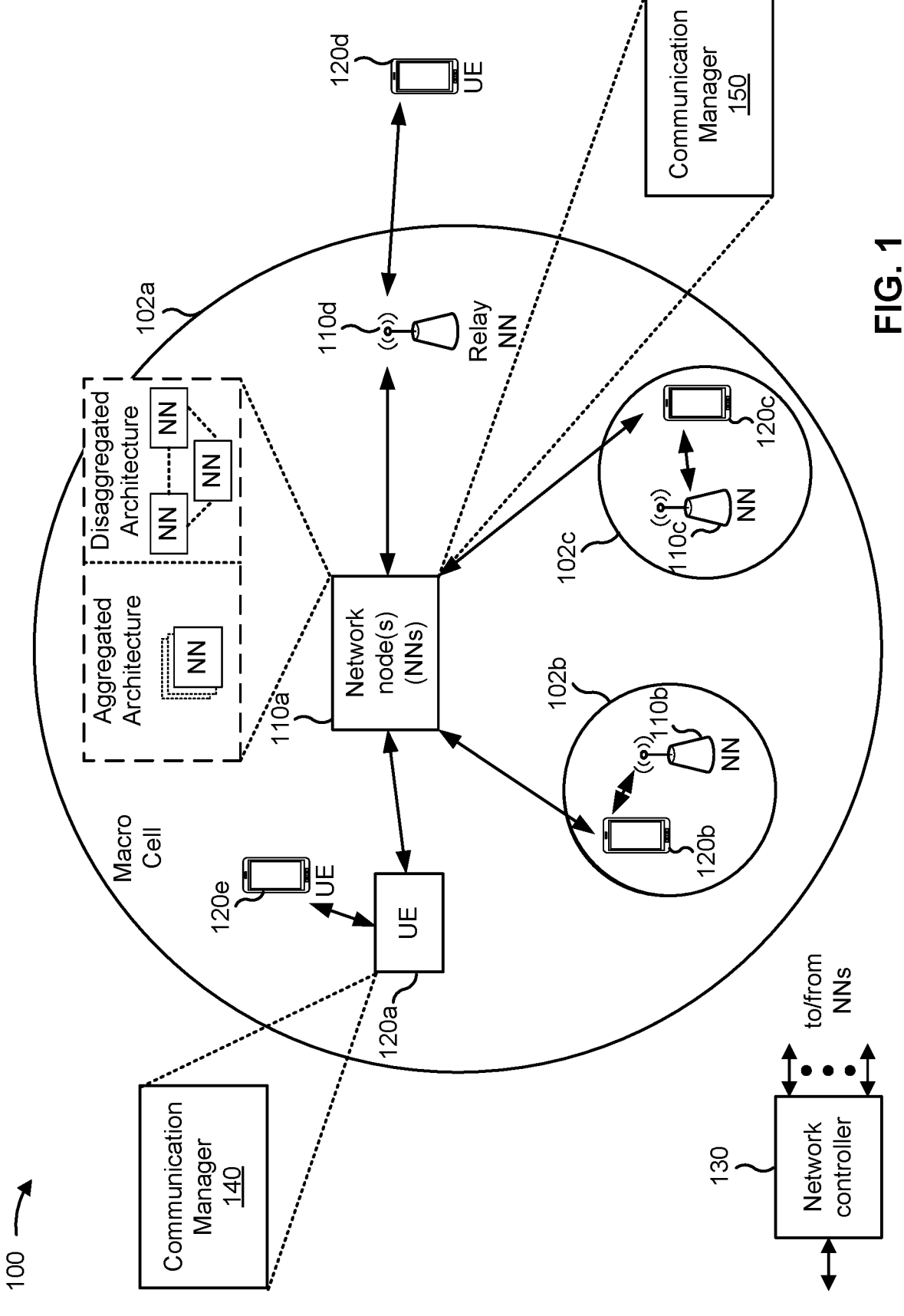
FIG. 1 is a diagram illustrating an example of a wireless network, in accordance with the present disclosure.

A network node may use sub-band full duplex (SBFD) operation to communicate on a downlink sub-band and an uplink sub-band concurrently. For example, the network node may transmit information to a first user equipment (UE) on the first sub-band and receive information from a second UE on the second sub-band. This may be referred to as a network node SBFD mode. The network node may divide a carrier into sub-bands for SBFD operation in accordance with an SBFD pattern. For example, the network node may divide a carrier (e.g., a component carrier (CC)) into a first sub-band for downlink communication and a second sub-band for uplink communication. Similarly, a UE that has a full-duplex capability may also operate in an SBFD mode, which may be referred to as a UE SBFD mode. For example, a single UE may receive information on a first sub-band and transmit information on a second sub-band, concurrently, with the sub-bands being based on an SBFD pattern.

However, during communication with a network node, a UE may experience differing directional traffic characteristics. For example, in a first time period, the UE may have a large amount of network traffic for transmission and a small amount of network traffic for reception, and in a second time period, the UE may have a large amount of network traffic for transmission and a large amount of network traffic for reception. In the first time period it may be beneficial for the UE to operate in a half-duplex mode and in the second time period it may be beneficial for the UE to operate in a full-duplex mode. However, when the UE and the network node have a fixed configuration, the UE and the network node may use, for example, a full duplex mode for both the first time and the second time, resulting in an inefficient usage of network resources during the first time period. Alternatively, the UE and the network node may use a half duplex mode for both the first time and the second time, resulting in excessive communication latency during the second time period. Additionally, in some scenarios, a UE self-interference, as a result of full duplex operation, may be greater than a threshold (e.g., as a result of a presence of a reflector), which may result in poor communication performance. In this case, it may be beneficial for the UE to stop using a UE SBFD mode. Additionally, in some scenarios, a network node, communicating with a first UE in network node SBFD on a first sub-band, may not be able to identify a second UE with a relatively low inter-UE cross-link interference (CLI) level to select for communication on a second sub-band. In this case, it may be beneficial for the network node to stop using a network node SBFD mode.

Some aspects described herein enable dynamic switching between SBFD modes. For example, a UE may receive information identifying an SBFD pattern and a type of SBFD mode for which the SBFD pattern applies. In this case, the UE and the network node can switch from a first SBFD pattern associated with a first SBFD mode to a second SBFD pattern associated with a second SBFD mode. For example, the network node may transmit information identifying, selecting, or activating a UE SBFD pattern, which may trigger the UE to switch to using the UE SBFD pattern for UE SBFD. Alternatively, the network node may transmit information identifying, selecting, or activating a network node SBFD pattern, which may trigger the UE to switch to using the network node SBFD pattern for network node SBFD (e.g., UE half duplex operation). In some aspects, the UE may request and/or recommend an SBFD mode and associated SBFD pattern. In some aspects, the UE may report a capability associated with dynamic switching and the network node may transmit information to trigger a switch based at least in part on the capability. In this way, the UE and the network node enable dynamic switching between SBFD modes, which enables improved utilization of network resources and reduced interference.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node"

may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrow band IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind. unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, information identifying a sub-band full duplex (SBFD) pattern, wherein the information identifying the SBFD pattern includes an indicator of whether the SBFD pattern is for a UE SBFD mode or a network node SBFD mode; and communicate, with the network node, on one or more sub-bands in accordance with the SBFD pattern and the indicator of whether the SBFD pattern is for the UE SBFD mode or the network node SBFD mode. Additionally, or alternatively, the communication manager 140 may perform one or more other operations described herein.

In some aspects, the network node 110 may include a communication manager 150. As described in more detail elsewhere herein, the communication manager 150 may transmit, to a UE, information identifying an SBFD pattern, wherein the information identifying the SBFD pattern includes an indicator of whether the SBFD pattern is for a UE SBFD mode or a network node SBFD mode; and communicate, with the UE, on one or more sub-bands in accordance with the SBFD pattern and the indicator of whether the SBFD pattern is for the UE SBFD mode or the network node SBFD mode. Additionally, or alternatively, the communication manager 150 may perform one or more other operations described herein.

As indicated above, FIG. 1 is provided as an example. Other examples may differ from what is described with regard to FIG. 1.

Figure 2:
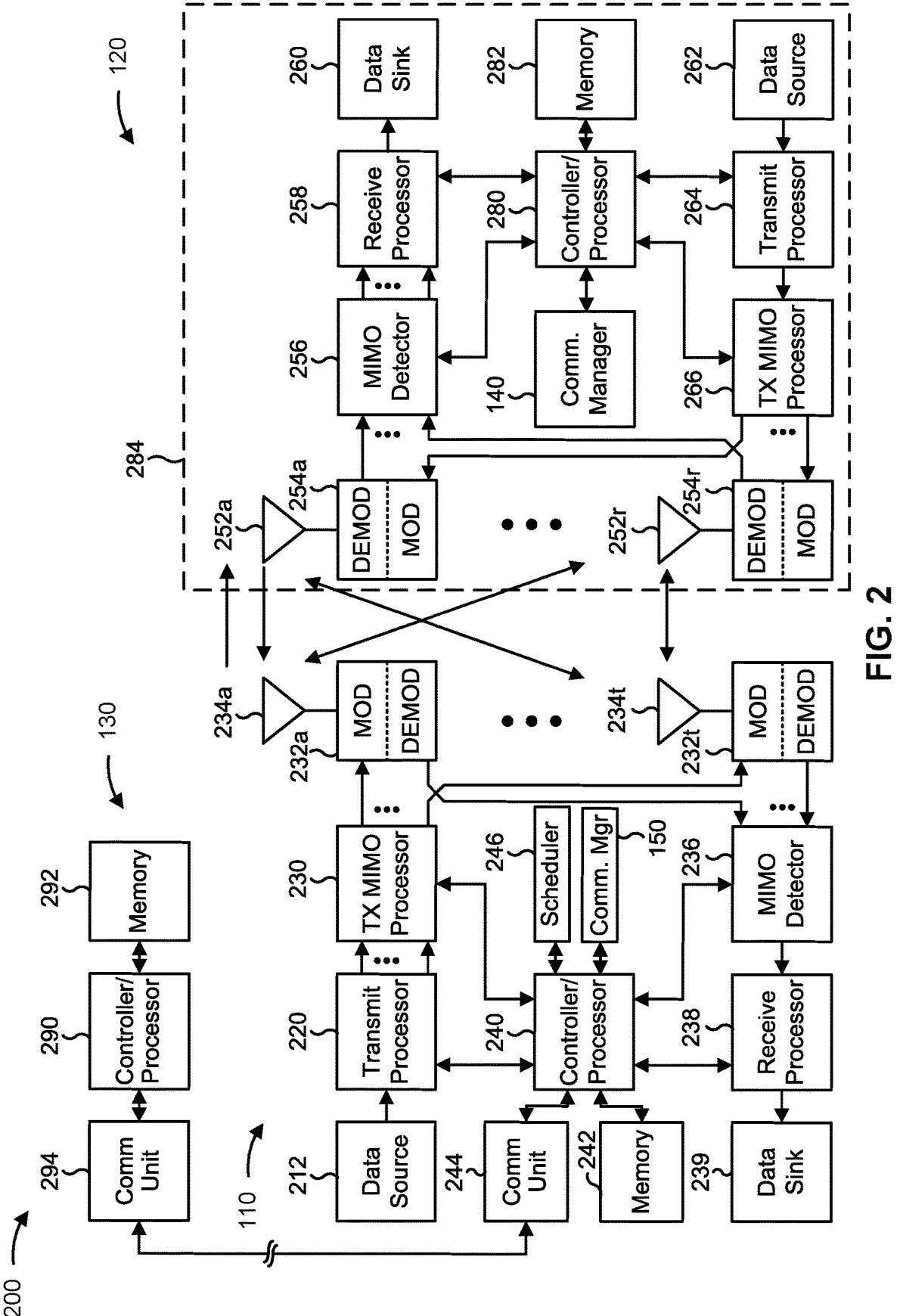
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with dynamic switching between SBFD configurations, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network node, information identifying an SBFD pattern, wherein the information identifying the SBFD pattern includes an indicator of whether the SBFD pattern is for a UE SBFD mode or a network node SBFD mode; and/or means for communicating, with the network node, on one or more sub-bands in accordance with the SBFD pattern and the indicator of whether the SBFD pattern is for the UE SBFD mode or the network node SBFD mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, information identifying an SBFD pattern, wherein the information identifying the SBFD pattern includes an indicator of whether the SBFD pattern is for a UE SBFD mode or a network node SBFD mode; and/or means for communicating, with the UE, on one or more sub-bands in accordance with the SBFD pattern and the indicator of whether the SBFD pattern is for the UE SBFD mode or the network node SBFD mode. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
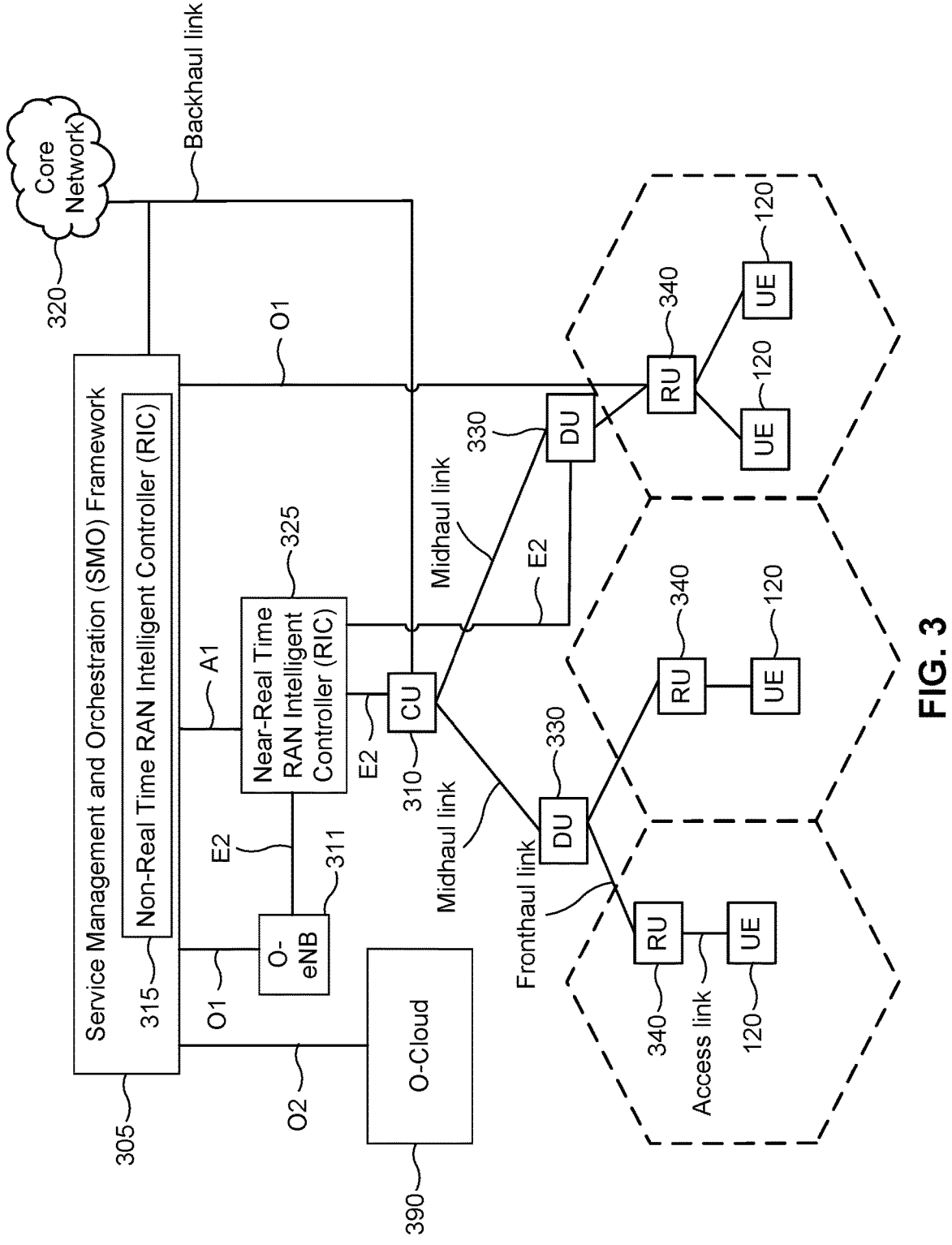
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
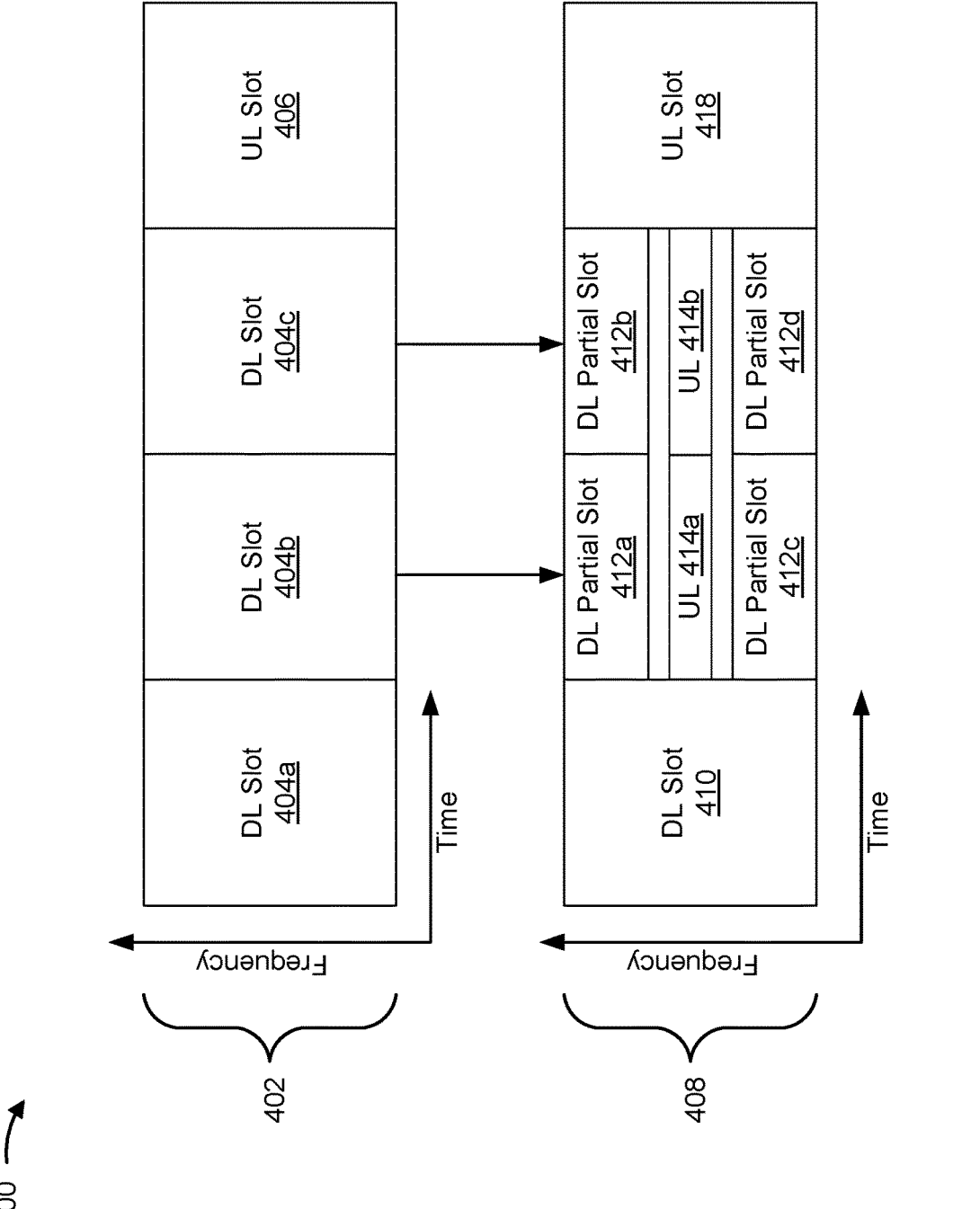
FIG. 4 is a diagram illustrating an example of sub-band full duplex (SBFD) activation, in accordance with the present disclosure.

FIG. 4 is a diagram illustrating an example 400 of sub-band full duplex (SBFD) activation, in accordance with the present disclosure. As shown in FIG. 4, example 400 includes a first configuration 402. In some examples, the first configuration 402 may indicate a first slot format pattern (sometimes called a time division duplex (TDD) pattern) associated with a half-duplex mode or a full-duplex mode. The first slot format pattern may include a quantity of downlink slots (e.g., three downlink slots 404a, 404b, and 404c, as shown), a quantity of flexible slots (not shown), and/or a quantity of uplink slots (e.g., one uplink slot 406, as shown). The first slot format pattern may repeat over time. In some examples, a network node 110 may indicate the first slot format pattern to a UE 120 using one or more slot format indicators. A slot format indicator, for a slot, may indicate whether that slot is an uplink slot, a downlink slot, or a flexible slot, among other examples.

A network node may instruct (e.g., using an indication, such as a radio resource control (RRC) message, a medium access control (MAC) control element (CE) (MAC-CE), or downlink control information (DCI)) a UE to switch from the first configuration 402 to a second configuration 408. As an alternative, the UE may indicate to the network node that the UE is switching from the first configuration 402 to the second configuration 408. The second configuration 408 may indicate a second slot format pattern that repeats over time, similar to the first slot format pattern. In any of the examples described above, the UE may switch from the first configuration 402 to the second configuration 408 during a time period (e.g., a quantity of symbols and/or an amount of time) based at least in part on an indication received from the network node (e.g., before switching back to the first configuration 402). During that time period, the UE may communicate using the second slot format pattern, and then may revert to using the first slot format pattern after the end of the time period. The time period may be indicated by the network node (e.g., in the instruction to switch from the first configuration 402 to the second configuration 408, as described above) and/or based at least in part on a programmed and/or otherwise preconfigured rule. For example, the rule may be based at least in part on a table (e.g., defined in 3GPP specifications and/or another wireless communication standard) that associates different sub-carrier spacings (SCSs) and/or numerologics (e.g., represented by μ and associated with corresponding SCSs) with corresponding time periods for switching configurations.

In example 400, the second slot format pattern includes two SBFD slots in place of what were downlink slots in the first slot format pattern. In example 400, the second slot format pattern includes a downlink slot 410 and an uplink slot 418. In example 400, each SBFD slot includes a partial slot (e.g., a portion or sub-band of a frequency allocated for use by the network node and the UE) for downlink (e.g., partial slots 412a, 412b, 412c, and 412d, as shown) and a partial slot for uplink (e.g., partial slots 414a and 414b, as shown). Accordingly, the UE may operate using the second slot format pattern to transmit an uplink communication in an earlier slot (e.g., the second slot in sequence, shown as partial UL slot 414a) as compared to using the first slot format pattern (e.g., the fourth slot in sequence, shown as UL slot 406). Other examples may include additional or alternative changes. For example, the second configuration 408 may indicate an SBFD slot in place of what was an uplink slot in the first configuration 402 (e.g., UL slot 406). In another example, the second configuration 408 may indicate a downlink slot or an uplink slot in place of what was an SBFD slot in the first configuration 402 (not shown in FIG. 4). In yet another example, the second configuration 408 may indicate a downlink slot or an uplink slot in place of what was an uplink slot or a downlink slot, respectively, in the first configuration 402. An "SBFD slot" may refer to a slot in which an SBFD format is used. An SBFD format may include a slot format in which full duplex communication is supported (e.g., for both uplink and downlink communications), with one or more frequencies used for an uplink portion of the slot being separated from one or more frequencies used for a downlink portion of the slot by a guard band.

In some examples, the SBFD format may include a single uplink portion and a single downlink portion separated by a guard band. In some examples, the SBFD format may include multiple downlink portions and a single uplink portion that is separated from the multiple downlink portions by respective guard bands (e.g., as shown in FIG. 4). In some examples, an SBFD format may include multiple uplink portions and a single downlink portion that is separated from the multiple uplink portions by respective guard bands. In some examples, the SBFD format may include multiple uplink portions and multiple downlink portions, where each uplink portion is separated from a downlink portion by a guard band. In some examples, operating using an SBFD mode may include activating or using a full duplex (FD) mode in one or more slots based at least in part on the one or more slots having the SBFD format. A slot may support the SBFD mode if an uplink bandwidth part (BWP) and a downlink BWP are permitted to be or are simultaneously active in the slot in an SBFD fashion (e.g., with guard band separation).

By switching from the first configuration 402 to the second configuration 408, the network node and the UE (or UEs) may experience increased quality and/or reliability of communications. For example, the network node and the UE (or UEs) may experience increased throughput (e.g., using a full-duplex mode), reduced latency (e.g., the UE may be able to transmit an uplink and/or a downlink communication sooner using the second configuration 408 rather than the first configuration 402), and increased network resource utilization (e.g., by using both the downlink BWP and the uplink BWP simultaneously instead of only the downlink BWP or the uplink BWP). Although some aspects are described herein in terms of a slot-level granularity, as shown in FIG. 4, other granularities are possible, such as a sub-slot level granularity or a symbol level granularity, among other examples.

As indicated above, FIG. 4 is provided as an example. Other examples may differ from what is described with respect to FIG. 4.

FIGS. 5A-5E are diagrams illustrating examples of duplex communication in accordance with the present disclosure. The example 500 of FIG. 5A includes a UE1 502 and two network nodes (e.g., TRPs) 504-1, 504-2, where the UE1 502 is sending UL transmissions to network node 504-1 and is receiving DL transmissions from network node 504-2. In the example 500 of FIG. 5A, full duplex (FD) is enabled for the UE1 502, but not for the network nodes 504-1, 504-2. The example 510 of FIG. 5B includes two UEs, shown as UE1 502-1 and UE2 502-2, and a network node 504, where the UE1 502-1 is receiving a DL transmission from the network node 504 and the UE2 502-2 is transmitting an UL transmission to the network node 504. In the example 510 of FIG. 5B, FD is enabled for the network node 504, but not for UE1 502-1 and UE2 502-2. The example 520 of FIG. 5C includes a UE1 502 and a network node 504, where the UE1 502 is receiving a DL transmission from the network node 504 and the UE1 502 is transmitting an UL transmission to the network node 504. In the example 520 of FIG. 5C, FD is enabled for both the UE1 502 and the network node 504.

Figure 5B:
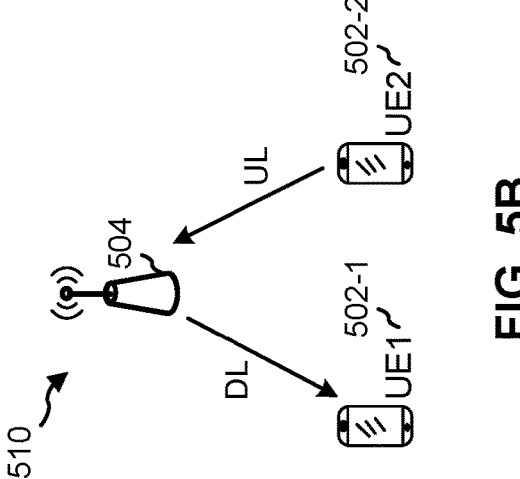
Figure 5C:
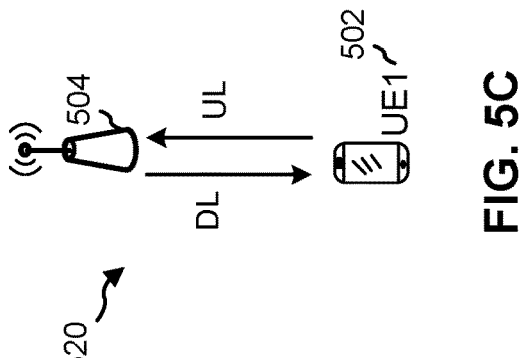
Figure 5A:
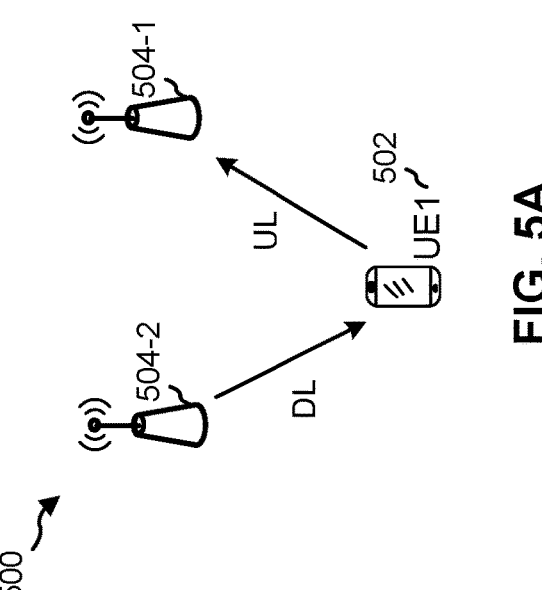
Figure 5D:
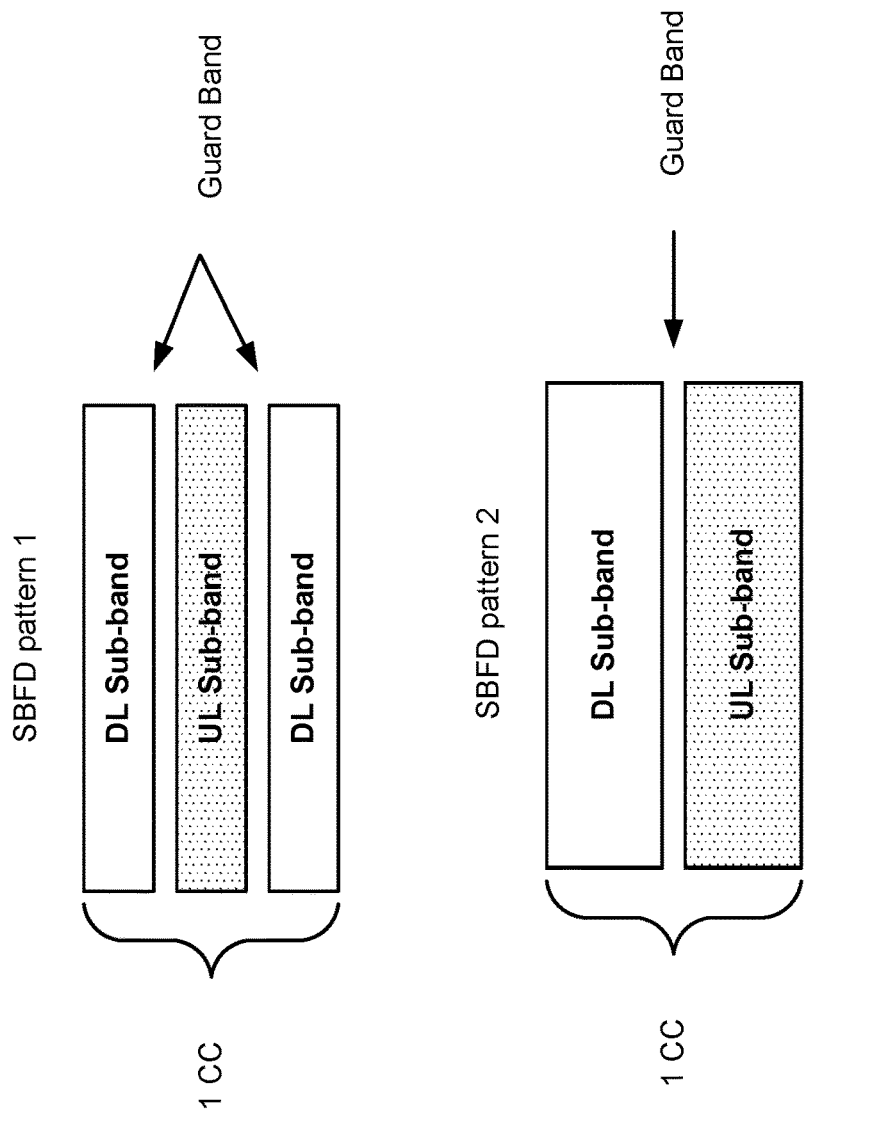

In example 550 of FIG. 5D and in example 560 of FIG. 5E, a set of sub-band patterns are shown, for example, for a network node SBFD mode, such as the FD mode of example 510 or the FD mode of example 520. In a first SBFD pattern ("SBFD pattern 1"), a component carrier (CC) is divided into a set of 3 sub-bands with a first sub-band and a third sub-band being for downlink operations (e.g., communication between network node 504 and UE1 502-1, in example 550, or communication between network node 504 and UE1 502, in example 560) and a second sub-band being for uplink operations (e.g., communication between UE2 502-2 and network node 504, in example 550, or communication between network node 504 and UE1 502, in example 560). In this case, guard bands are present between the first sub-band and the second sub-band and between the second sub-band and the third sub-band. The guard bands may reduce a likelihood of cross-link interference between downlink communications and uplink communications. In a second SBFD pattern ("SBFD pattern 2"), a CC is divided into a set of 2 sub-bands with a first sub-band being for downlink operations and a second sub-band being for uplink operations. In this case, a guard band is present between the first sub-band and the second sub-band to reduce a likelihood of cross-link interference between downlink communications and uplink communications.

As indicated above, FIGS. 5A-5E are provided as one or more examples. Other examples may differ from what is described with regard to FIGS. 5A-5E.

Figure 6:
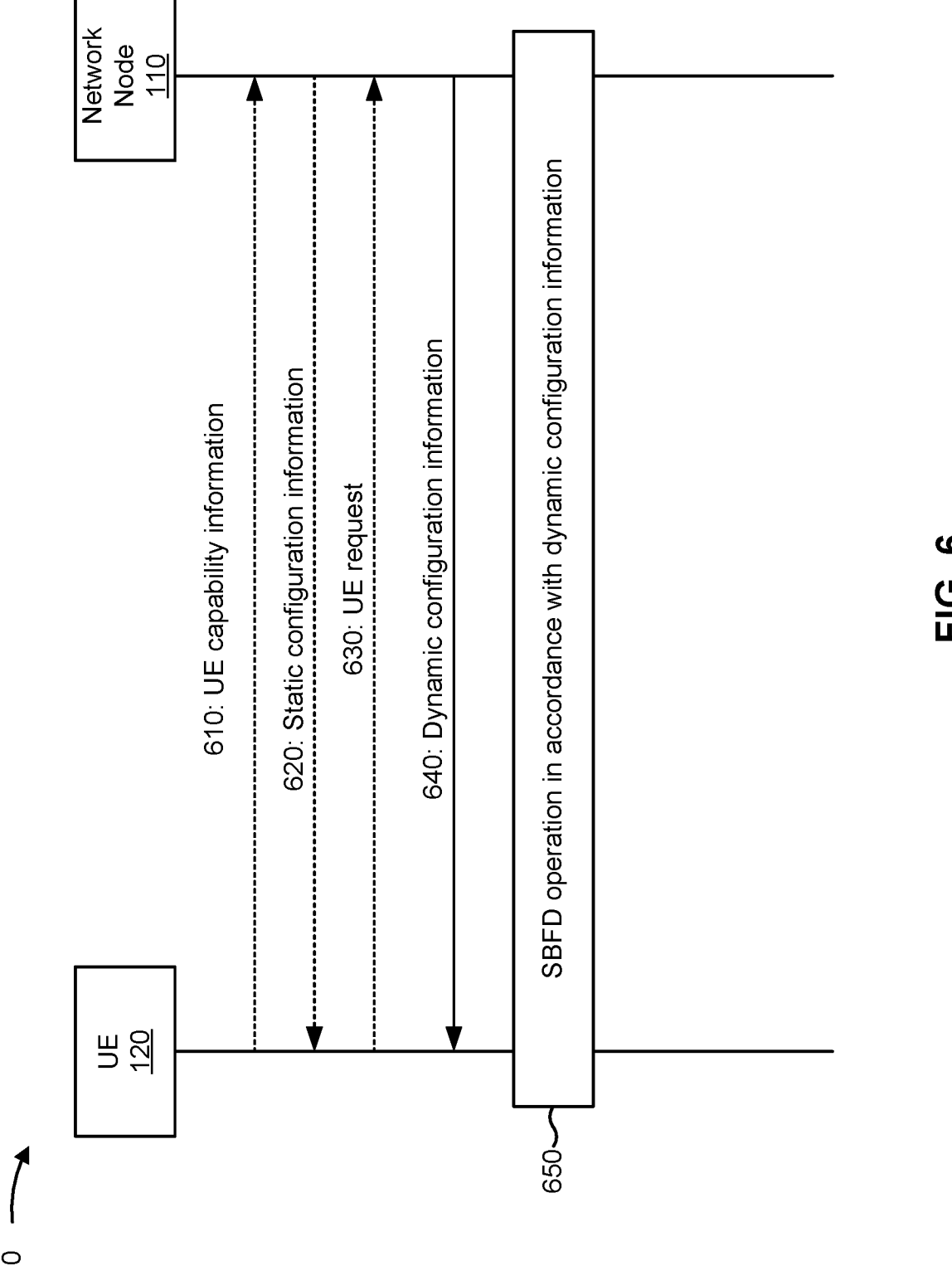
FIG. 6 is a diagram illustrating an example associated with dynamic switching between SBFD configurations, in accordance with the present disclosure.

FIG. 6 is a diagram illustrating an example 600 associated with dynamic switching between SBFD configurations, in accordance with the present disclosure. As shown in FIG. 6, example 600 includes communication between a network node 110 and a UE 120.

As further shown in FIG. 6, and by reference number 610, the UE 120 may transmit capability information to the network node 110. For example, the UE 120 may transmit a report message including information identifying a capability for dynamic switching between SBFD modes, such as between a network node SBFD mode and a UE SBFD mode. In some examples, the UE 120 may indicate that the UE 120 does not support dynamic switching between SBFD modes. In this case, the UE 120 may transmit a message indicating support for only one of the network node SBFD mode or the UE SBFD mode, and the network node may periodically configure the supported mode.

In some aspects, the UE 120 may transmit capability information indicating support for dynamic switching between SBFD modes. For example, the UE 120 may support both UE SBFD and network node SBFD. In some aspects, the UE 120 may indicate support for both SBFD modes non-concurrently. For example, the UE 120 may indicate that the UE 120 can be configured with only a single SBFD mode at a time. In this case, when the UE 120 receives information identifying an SBFD pattern, as described below, the SBFD pattern is associated with either the network node SBFD mode or the UE SBFD mode, but not both SBFD modes. Additionally, or alternatively, the UE 120 may transmit an indication of support for an SBFD pattern being configured for both network node SBFD and UE SBFD concurrently. In other words, the UE 120 indicates support for both SBFD modes and supports both modes in a same configured SBFD pattern. In this case, when the UE 120 receives information identifying an SBFD pattern, as described below, the SBFD pattern may have a first set of symbols configured for use of the network node SBFD mode and a second set of symbols configured for use of the UE SBFD mode.

Additionally, or alternatively, the UE 120 may transmit an indication of support for configuration of both SBFD modes for the same or different configured patterns. For example, the UE 120 may indicate support for both SBFD modes and support for both modes being configured in a same SBFD pattern or in different SBFD patterns. The UE 120 may indicate support for dynamic switching between different SBFD patterns and corresponding modes via, for example, dynamic signaling, such as medium access control (MAC) control element (CE) (MAC-CE) signaling or downlink control information (DCI) signaling, among other examples. In this case, when the UE 120 receives information identifying an SBFD pattern, as described below, the SBFD pattern may have different sets of symbols configured for use of different SBFD modes, or the UE may receive information identifying a set of SBFD patterns with different SBFD patterns being configured for use of different SBFD modes.

As further shown in FIG. 6, and by reference number 620, the network node 110 may transmit static configuration information to the UE 120. For example, the network node 110 may transmit radio resource control (RRC) signaling indicating an SBFD pattern and/or whether the SBFD pattern is for the network node SBFD mode or the UE SBFD mode. In some aspects, the network node 110 may include an explicit indicator of an SBFD mode. For example, the network node 110 may configure, for the RRC signaling, an indicator on a per-SBFD pattern basis to indicate an SBFD mode for each indicated or configured SBFD pattern. Additionally, or alternatively, the network node 110 may configure a first set of SBFD patterns for the network node SBFD mode and a second set of SBFD patterns for the UE SBFD mode (e.g., via separate RRC messages or via separate information elements of a common RRC message).

In some aspects, the network node 110 may implicitly indicate whether an SBFD pattern is for the network node SBFD mode or the UE SBFD mode. For example, the network node 110 may configure an SBFD pattern and, based at least in part on a characteristic of the SBFD pattern, the UE 120 may determine whether the SBFD pattern is for the network node SBFD mode or the UE SBFD mode (e.g., based at least in part on a configured rule). As an example, when the network node 110 configures an SBFD pattern with overlapping downlink and uplink sub-bands, the UE 120 may determine that the SBFD pattern is for the UE SBFD mode (e.g., without an explicit indicator being included in the RRC signaling).

In some aspects, the network node 110 may configure SBFD patterns with a plurality of time durations corresponding to different SBFD modes. For example, the network node 110 may configure an SBFD pattern with a first time duration for the network node SBFD mode and a second time duration for the UE SBFD mode. In this case, as one example, in a period of 6 slots, a first duration of slots 1-3 may include symbols for the network node SBFD mode and a second duration of slots 4-6 may include symbols for the UE SBFD mode. The network node 110 may indicate the symbol locations for each SBFD mode in the RRC signaling.

As further shown in FIG. 6, and by reference number 630, the UE 120 may transmit a UE request to the network node 110. For example, the UE 120 may transmit a request message or recommendation message identifying an SBFD mode to which the UE 120 is requested to transition. In some aspects, the UE 120 may transmit a request message based at least in part on a traffic characteristic. For example, the UE 120 may determine that an amount of UE traffic (e.g., on an uplink or a downlink) satisfies a threshold and may request that the UE 120 switch SBFD modes to increase or decrease an amount of allocated resources for communicating the UE traffic. In this case, the amount of UE traffic may be a measured amount of traffic (e.g., in a buffer) or a predicted amount of traffic (e.g., based at least in part on historical data, which applications are running, or another factor). Additionally, or alternatively, the UE 120 may transmit the request message based at least in part on an interference characteristic. For example, the UE 120 may determine a measurement or prediction value for self-interference or cross-link interference, and may use the determined value to request a switch between SBFD modes to reduce a likelihood of interference or take advantage of reduced measured or predicted interference.

In some aspects, the UE 120 may transmit the request message via a particular type of message, such as a MAC-CE or uplink control information (UCI). For example, the UE 120 may transmit MAC-CE signaling or UCI signaling to request or recommend an applied or potentially applied SBFD pattern for network node SBFD or UE SBFD. In this case, the UE 120 may have a single configured SBFD pattern or may have an activated or selected SBFD pattern (e.g., an SBFD pattern that was previously activated or selected, from a plurality of configured SBFD patterns, by dynamic signaling, such as MAC-CE signaling or DCI signaling, by the network node 110).

When the UE 120 transmits MAC-CE signaling, the UE 120 may include an indicator (e.g., a 1-bit indicator) to indicate a mode for an applied SBFD pattern (e.g., when a single SBFD pattern is configured). Additionally, or alternatively, when the UE 120 transmits MAC-CE signaling, the UE 120 may include an indicator (e.g., a 1-bit indicator) per activated SBFD pattern identifier associated with a corresponding SBFD mode. In these examples, the UE 120 may transmit the MAC-CE signaling using an existing uplink grant or via an uplink grant requested via a scheduling request (SR) transmission.

When the UE 120 transmits UCI signaling, the UE 120 may include an indicator (e.g., a 1-bit indicator) to indicate a mode for an applied SBFD pattern (e.g., when a single SBFD pattern is configured). Additionally, or alternatively, when the UE 120 transmits UCI signaling, the UE 120 may include an indicator (e.g., a 1-bit indicator) per activated SBFD pattern identifier associated with a corresponding SBFD mode. In these examples, the UE 120 may transmit the UCI signaling as a standalone transmission or multiplexed with other UCI (e.g., an acknowledgment (ACK) message, an SR, a channel state information (CSI) report, among other examples) in a physical uplink control channel (PUCCH) or a physical uplink shared channel (PUSCH), among other examples. In the case of a PUSCH communication, the UCI conveying the UE request may have a multiplexing priority that is specific to a UCI type of the SBFD information or SBFD preference feedback.

In some aspects, the UE 120 may transmit a request message to dynamically indicate that different time durations of a same SBFD pattern are for different SBFD modes. For example, the UE 120 may transmit MAC-CE signaling or UCI signaling to indicate that a particular SBFD pattern is for the network node SBFD mode for a first duration and the UE SBFD mode for a second duration. In this case, the durations can have different granularities, such as being specified in absolute time (e.g., milliseconds (ms), symbols, sub-slots, slots, or frames, among other examples). In some aspects, the above-mentioned SBFD pattern with different durations is an applied SBFD pattern or a potentially applied SBFD pattern. In other words, the UE 120 may transmit the request message to dynamically indicate different durations for an SBFD pattern that is being used for an SBFD pattern that is configured and could be used, but is not currently being used. Additionally, or alternatively, the UE 120 may dynamically update a mode for an SBFD pattern using a MAC-CE or UCI. For example, the UE 120 may transmit a bitmap via MAC-CE signaling or UCI, with bits of the bitmap indicating whether corresponding SBFD patterns or corresponding durations of a single SBFD pattern are for the network node SBFD mode or the UE SBFD mode.

As further shown in FIG. 6, and by reference number 640, the network node 110 may transmit dynamic configuration information to the UE 120. For example, the network node 110 may transmit dynamic signaling, such as MAC-CE signaling or DCI signaling, to indicate whether an applied or potentially applied SBFD pattern is for network node SBFD or UE SBFD. In this case, as described above with regard to UE signaling, the indication of a mode of SBFD may apply to an SBFD pattern that is an only configured SBFD pattern (e.g., in a first case where there is a single pattern that is configured) or may apply to an activated or selected SBFD pattern (e.g., in a second case where there are a plurality of configured SBFD patterns and one of the plurality of configured SBFD patterns is activated or selected by the above-described dynamic signaling or other dynamic signaling).

When the network node 110 transmits MAC-CE signaling, the network node 110 may include an indicator (e.g., a 1-bit indicator) to indicate a mode for an applied SBFD pattern (e.g., when a single SBFD pattern is configured). Additionally, or alternatively, when the network node 110 transmits MAC-CE signaling, the network node 110 may include an indicator (e.g., a 1-bit indicator) per activated SBFD pattern identifier associated with a corresponding SBFD mode. In these examples, the network node 110 may transmit the MAC-CE signaling using a unicast transmission, a multicast transmission, or a broadcast transmission, among other examples.

When the network node 110 transmits DCI signaling, the network node 110 may include an indicator (e.g., a 1-bit indicator) to indicate a mode for an applied SBFD pattern (e.g., when a single SBFD pattern is configured). Additionally, or alternatively, when the network node 110 transmits DCI signaling, the network node 110 may include an indicator (e.g., a 1-bit indicator) per activated SBFD pattern identifier associated with a corresponding SBFD mode. In these examples, the network node 110 may transmit the DCI signaling as a unicast transmission, a multicast transmission, or a broadcast transmission, among other examples. In some aspects, the network node 110 may transmit the DCI signaling in a DCI message that schedules network traffic (e.g., a scheduling DCI) or in a DCI message that does not schedule traffic (e.g., a non-scheduling DCI).

In some aspects, the network node 110 may transmit the dynamic signaling to dynamically indicate that different time durations of a same SBFD pattern are for different SBFD modes. For example, the network node 110 may transmit MAC-CE signaling or DCI signaling to indicate that a particular SBFD pattern is for the network node SBFD mode for a first duration and the UE SBFD mode for a second duration. In this case, the durations can have different granularities, such as being specified in absolute time (e.g., milliseconds (ms), symbols, sub-slots, slots, or frames, among other examples). In some aspects, the above-mentioned SBFD pattern with different durations is an applied SBFD pattern or a potentially applied SBFD pattern. In other words, the network node 110 may transmit the dynamic signaling to dynamically indicate different durations for an SBFD pattern that is being used for an SBFD pattern that is configured and could be used, but is not currently being used. Additionally, or alternatively, the network node 110 may dynamically update a mode for an SBFD pattern using a MAC-CE or DCI. For example, the network node 110 may transmit a bitmap via MAC-CE signaling or DCI, with bits of the bitmap indicating whether corresponding SBFD patterns or corresponding durations of a single SBFD pattern are for the network node SBFD mode or the UE SBFD mode.

As further shown in FIG. 6, and by reference number 650, the network node 110 and the UE 120 may communicate in an SBFD mode using an SBFD pattern. For example, the UE 120 may switch from a first SBFD mode to a second SBFD mode based at least in part on the network node 110 transmitting configuration information identifying an SBFD mode for an SBFD pattern and/or selecting an SBFD pattern associated with a particular SBFD mode. In some aspects, the UE 120 may periodically switch between SBFD modes based at least in part on configured durations for different SBFD modes or SBFD patterns. For example, when the UE 120 is configured with a first duration for using an SBFD pattern with a first SBFD mode and a second duration for using the SBFD pattern with a second SBFD mode, the UE 120 may switch from the first SBFD mode to the second SBFD mode in accordance with the first duration ending and the second duration starting.

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120) performs operations associated with dynamic switching between SBFD configurations.

As shown in FIG. 7, in some aspects, process 700 may include receiving, from a network node, information identifying an SBFD pattern, wherein the information identifying the SBFD pattern includes an indicator of whether the SBFD pattern is for a UE SBFD mode or a network node SBFD mode (block 710). For example, the UE (e.g., using reception component 902 and/or communication manager 906, depicted in FIG. 9) may receive, from a network node, information identifying an SBFD pattern, wherein the information identifying the SBFD pattern includes an indicator of whether the SBFD pattern is for a UE SBFD mode or a network node SBFD mode, as described above.

As further shown in FIG. 7, in some aspects, process 700 may include communicating, with the network node, on one or more sub-bands in accordance with the SBFD pattern and the indicator of whether the SBFD pattern is for the UE SBFD mode or the network node SBFD mode (block 720). For example, the UE (e.g., using reception component 902, transmission component 904, and/or communication manager 906, depicted in FIG. 9) may communicate, with the network node, on one or more sub-bands in accordance with the SBFD pattern and the indicator of whether the SBFD pattern is for the UE SBFD mode or the network node SBFD mode, as described above.

Process 700 may include additional aspects, such as any single aspect or any combination of aspects described below and/or in connection with one or more other processes described elsewhere herein.

In a first aspect, the SBFD pattern is an SBFD time and frequency pattern.

In a second aspect, alone or in combination with the first aspect, the information identifying the SBFD pattern is received via at least one of a radio resource control message, a downlink control information message, a MAC-CE message, or a combination thereof.

In a third aspect, alone or in combination with one or more of the first and second aspects, the information identifying the SBFD pattern includes at least one of an SBFD type indicator, a selection of the SBFD pattern from a set of SBFD patterns, or a combination thereof.

In a fourth aspect, alone or in combination with one or more of the first through third aspects, whether the SBFD pattern is for the UE SBFD mode or the network node SBFD mode is based at least in part on a content of the SBFD pattern.

In a fifth aspect, alone or in combination with one or more of the first through fourth aspects, the indicator identifies, for the SBFD pattern, a first time period for the UE SBFD mode and a second time period for the network node SBFD mode.

In a sixth aspect, alone or in combination with one or more of the first through fifth aspects, the first time period and the second time period are associated with a granularity at a symbol level, a slot level, or a frame level.

In a seventh aspect, alone or in combination with one or more of the first through sixth aspects, the information identifying the SBFD pattern includes information selecting the SBFD pattern from a set of configured SBFD patterns or activating the SBFD pattern.

In an eighth aspect, alone or in combination with one or more of the first through seventh aspects, the information identifying the SBFD pattern includes first information, received via radio resource control signaling associated with providing a configuration, and second information received via MAC-CE signaling or downlink control information signaling associated with providing a selection from the configuration or an update to the configuration.

In a ninth aspect, alone or in combination with one or more of the first through eighth aspects, the information identifying the SBFD pattern includes information identifying a mode associated with the SBFD pattern or information identifying a set of modes associated with a set of configured SBFD patterns.

In a tenth aspect, alone or in combination with one or more of the first through ninth aspects, process 700 includes transmitting a request message, wherein the request message indicates a request for using the UE SBFD mode or the network node SBFD mode, and wherein receiving the information identifying the SBFD pattern comprises receiving at least a portion of the information identifying the SBFD pattern based at least in part on the request message.

In an eleventh aspect, alone or in combination with one or more of the first through tenth aspects, the request message is based at least in part on at least one of a UE traffic metric, a self-interference metric, a cross-link interference metric, a prediction, or a combination thereof.

In a twelfth aspect, alone or in combination with one or more of the first through eleventh aspects, the request message is conveyed via a MAC-CE or uplink control information.

In a thirteenth aspect, alone or in combination with one or more of the first through twelfth aspects, the request message includes information identifying a selection of an SBFD pattern.

In a fourteenth aspect, alone or in combination with one or more of the first through thirteenth aspects, the request message includes an indication of a first time duration for using the UE SBFD mode and a second time duration for using the network node SBFD mode.

In a fifteenth aspect, alone or in combination with one or more of the first through fourteenth aspects, the first time duration and the second time duration are associated with a granularity at a symbol level, a slot level, or a frame level.

In a sixteenth aspect, alone or in combination with one or more of the first through fifteenth aspects, the UE is configured to transmit an update to a mode for an SBFD symbol.

In a seventeenth aspect, alone or in combination with one or more of the first through sixteenth aspects, the request message includes information identifying a single configured SBFD pattern or information identifying an activated or selected SBFD pattern of a plurality of configured SBFD patterns.

In an eighteenth aspect, alone or in combination with one or more of the first through seventeenth aspects, the request message includes a bit indicator of a mode of the SBFD pattern.

In a nineteenth aspect, alone or in combination with one or more of the first through eighteenth aspects, the request message includes a set of bit indicators of a set of configured SBFD patterns.

In a twentieth aspect, alone or in combination with one or more of the first through nineteenth aspects, the request message is conveyed via an uplink grant or an uplink grant request associated with a scheduling request.

In a twenty-first aspect, alone or in combination with one or more of the first through twentieth aspects, the request message is conveyed with at least one other uplink message type.

In a twenty-second aspect, alone or in combination with one or more of the first through twenty-first aspects, a multiplexing priority is configured for the request message.

In a twenty-third aspect, alone or in combination with one or more of the first through twenty-second aspects, process 700 includes transmitting capability information identifying a capability associated with the UE SBFD mode and the network node SBFD mode, and receiving the information identifying the SBFD pattern comprises receiving at least a portion of the information identifying the SBFD pattern based at least in part on transmitting the capability information.

In a twenty-fourth aspect, alone or in combination with one or more of the first through twenty-third aspects, the capability information indicates at least one of a capability for one of the UE SBFD mode or the network node SBFD mode, a capability for both the UE SBFD mode and the network node SBFD mode configured using different SBFD patterns, a capability for both the UE SBFD mode and the network node SBFD mode configured using a same SBFD pattern, a capability for both UE SBFD mode and the network node SBFD mode configured using a same SBFD pattern or using different SBFD patterns, a capability for dynamic switching between SBFD patterns, a capability for dynamic switching between SBFD modes, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with dynamic switching between SBFD configurations.

As shown in FIG. 8, in some aspects, process 800 may include transmitting, to a UE, information identifying an SBFD pattern, wherein the information identifying the SBFD pattern includes an indicator of whether the SBFD pattern is for a UE SBFD mode or a network node SBFD mode (block 810). For example, the network node (e.g., using transmission component 1004 and/or communication manager 1006, depicted in FIG. 10) may transmit, to a UE, information identifying an SBFD pattern, wherein the information identifying the SBFD pattern includes an indicator of whether the SBFD pattern is for a UE SBFD mode or a network node SBFD mode, as described above.

As further shown in FIG. 8, in some aspects, process 800 may include communicating, with the UE, on one or more sub-bands in accordance with the SBFD pattern and the indicator of whether the SBFD pattern is for the UE SBFD mode or the network node SBFD mode (block 820). For example, the network node (e.g., using reception component 1002, transmission component 1004, and/or communication manager 1006, depicted in FIG. 10) may communicate, with the UE, on one or more sub-bands in accordance with the SBFD pattern and the indicator of whether the SBFD pattern is for the UE SBFD mode or the network node SBFD mode, as described above.

Process 800 may include additional aspects, such as any single aspect or any combination of aspects described below and/or in connection with one or more other processes described elsewhere herein.

In a first aspect, the SBFD pattern is an SBFD time and frequency pattern.

In a second aspect, alone or in combination with the first aspect, the information identifying the SBFD pattern is received via at least one of a radio resource control message, a downlink control information message, a MAC-CE message, or a combination thereof.

In a third aspect, alone or in combination with one or more of the first and second aspects, the information identifying the SBFD pattern includes at least one of an SBFD type indicator, a selection of the SBFD pattern from a set of SBFD patterns, or a combination thereof.

In a fourth aspect, alone or in combination with one or more of the first through third aspects, whether the SBFD pattern is for the UE SBFD mode or the network node SBFD mode is based at least in part on a content of the SBFD pattern.

In a fifth aspect, alone or in combination with one or more of the first through fourth aspects, the indicator identifies, for the SBFD pattern, a first time period for the UE SBFD mode and a second time period for the network node SBFD mode.

In a sixth aspect, alone or in combination with one or more of the first through fifth aspects, the first time period and the second time period are associated with a granularity at a symbol level, a slot level, or a frame level.

In a seventh aspect, alone or in combination with one or more of the first through sixth aspects, the information identifying the SBFD pattern includes information selecting the SBFD pattern from a set of configured SBFD patterns or activating the SBFD pattern.

In an eighth aspect, alone or in combination with one or more of the first through seventh aspects, the information identifying the SBFD pattern includes first information, transmitted via radio resource control signaling associated with providing a configuration, and second information transmitted via MAC-CE signaling or downlink control information signaling associated with providing a selection from the configuration or an update to the configuration.

In a ninth aspect, alone or in combination with one or more of the first through eighth aspects, the information identifying the SBFD pattern includes information identifying a mode associated with the SBFD pattern or information identifying a set of modes associated with a set of configured SBFD patterns.

In a tenth aspect, alone or in combination with one or more of the first through ninth aspects, process 800 includes receiving a request message, wherein the request message indicates a request for using the UE SBFD mode or the network node SBFD mode, and wherein transmitting the information identifying the SBFD pattern comprises transmitting at least a portion of the information identifying the SBFD pattern based at least in part on the request message.

In an eleventh aspect, alone or in combination with one or more of the first through tenth aspects, the request message is based at least in part on at least one of a UE traffic metric, a self-interference metric, a cross-link interference metric, a prediction, or a combination thereof.

In a twelfth aspect, alone or in combination with one or more of the first through eleventh aspects, the request message is conveyed via a MAC-CE or uplink control information.

In a thirteenth aspect, alone or in combination with one or more of the first through twelfth aspects, the request message includes information identifying a selection of an SBFD pattern.

In a fourteenth aspect, alone or in combination with one or more of the first through thirteenth aspects, the request message includes an indication of a first time duration for using the UE SBFD mode and a second time duration for using the network node SBFD mode.

In a fifteenth aspect, alone or in combination with one or more of the first through fourteenth aspects, the first time duration and the second time duration are associated with a granularity at a symbol level, a slot level, or a frame level.

In a sixteenth aspect, alone or in combination with one or more of the first through fifteenth aspects, the network node is configured to receive an update to a mode for an SBFD symbol.

In a seventeenth aspect, alone or in combination with one or more of the first through sixteenth aspects, the request message includes information identifying a single configured SBFD pattern or information identifying an activated or selected SBFD pattern of a plurality of configured SBFD patterns.

In an eighteenth aspect, alone or in combination with one or more of the first through seventeenth aspects, the request message includes a bit indicator of a mode of the SBFD pattern.

In a nineteenth aspect, alone or in combination with one or more of the first through eighteenth aspects, the request message includes a set of bit indicators of a set of configured SBFD patterns.

In a twentieth aspect, alone or in combination with one or more of the first through nineteenth aspects, the request message is conveyed via an uplink grant or an uplink grant request associated with a scheduling request.

In a twenty-first aspect, alone or in combination with one or more of the first through twentieth aspects, the request message is conveyed with at least one other uplink message type.

In a twenty-second aspect, alone or in combination with one or more of the first through twenty-first aspects, a multiplexing priority is configured for the request message.

In a twenty-third aspect, alone or in combination with one or more of the first through twenty-second aspects, process 800 includes receiving capability information identifying a capability associated with the UE SBFD mode and the network node SBFD mode, and transmitting the information identifying the SBFD pattern comprises transmitting at least a portion of the information identifying the SBFD pattern based at least in part on receiving the capability information.

In a twenty-fourth aspect, alone or in combination with one or more of the first through twenty-third aspects, the capability information indicates at least one of a capability for one of the UE SBFD mode or the network node SBFD mode, a capability for both the UE SBFD mode and the network node SBFD mode configured using different SBFD patterns, a capability for both the UE SBFD mode and the network node SBFD mode configured using a same SBFD pattern, a capability for both UE SBFD mode and the network node SBFD mode configured using a same SBFD pattern or using different SBFD patterns, a capability for dynamic switching between SBFD patterns, a capability for dynamic switching between SBFD modes, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
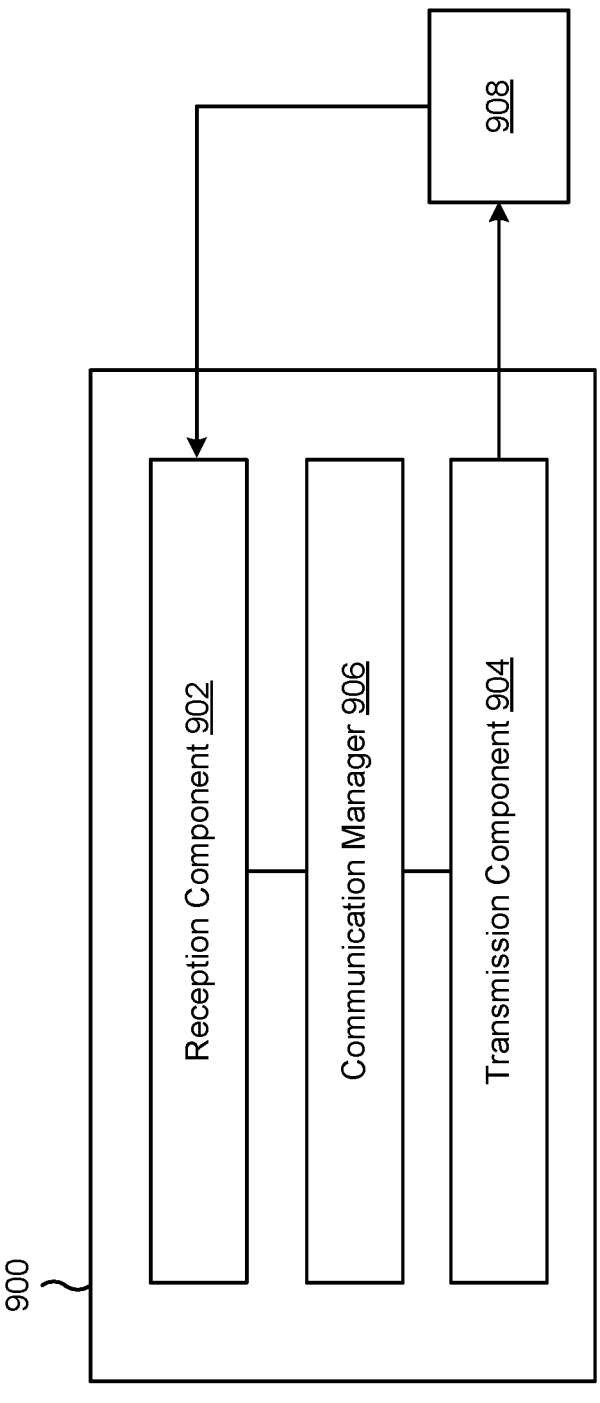
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a network node, information identifying an SBFD pattern, wherein the information identifying the SBFD pattern includes an indicator of whether the SBFD pattern is for a UE SBFD mode or a network node SBFD mode. The reception component 902 and/or the transmission component 904 may communicate, with the network node, on one or more sub-bands in accordance with the SBFD pattern and the indicator of whether the SBFD pattern is for the UE SBFD mode or the network node SBFD mode. The transmission component 904 may transmit a request message, wherein the request message indicates a request for using the UE SBFD mode or the network node SBFD mode. The transmission component 904 may transmit capability information identifying a capability associated with the UE SBFD mode and the network node SBFD mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
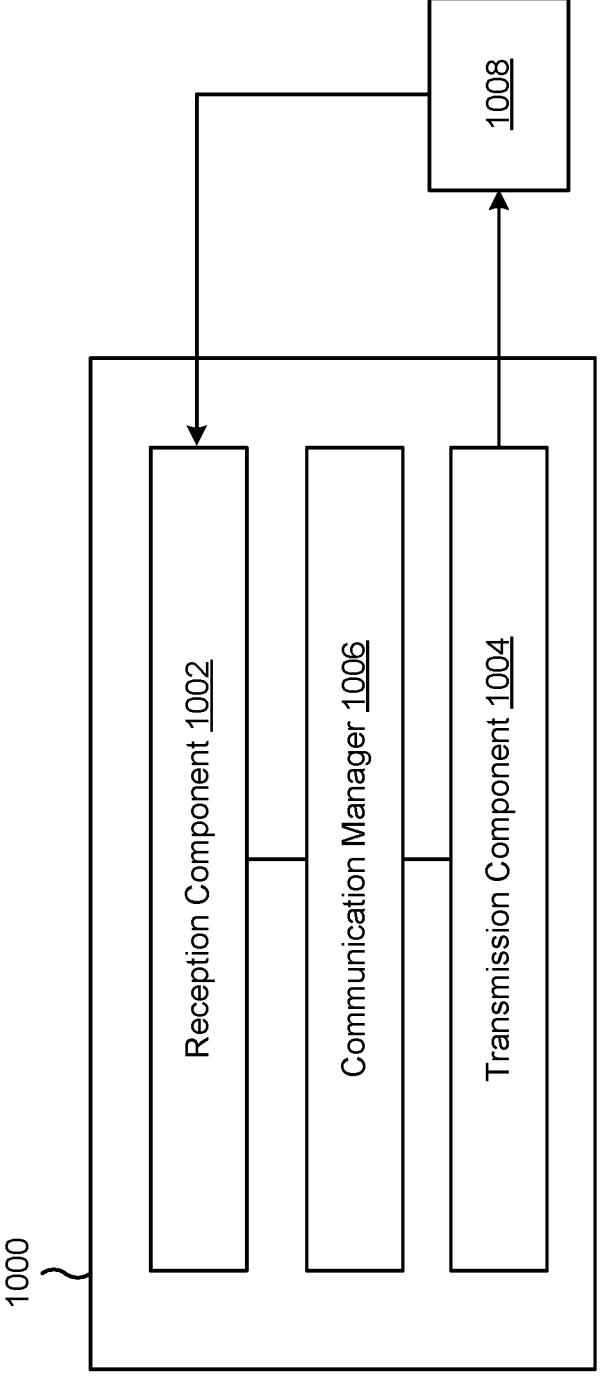
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a UE, information identifying an SBFD pattern, wherein the information identifying the SBFD pattern includes an indicator of whether the SBFD pattern is for a UE SBFD mode or a network node SBFD mode. The reception component 1002 and/or the transmission component 1004 may communicate, with the UE, on one or more sub-bands in accordance with the SBFD pattern and the indicator of whether the SBFD pattern is for the UE SBFD mode or the network node SBFD mode. The reception component 1002 may receive a request message, wherein the request message indicates a request for using the UE SBFD mode or the network node SBFD mode. The reception component 1002 may receive capability information identifying a capability associated with the UE SBFD mode and the network node SBFD mode.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a network node, information identifying a sub-band full duplex (SBFD) pattern, wherein the information identifying the SBFD pattern includes an indicator of whether the SBFD pattern is for a UE SBFD mode or a network node SBFD mode; and communicating, with the network node, on one or more sub-bands in accordance with the SBFD pattern and the indicator of whether the SBFD pattern is for the UE SBFD mode or the network node SBFD mode.

Aspect 2: The method of Aspect 1, wherein the SBFD pattern is an SBFD time and frequency pattern.

Aspect 3: The method of any of Aspects 1-2, wherein the information identifying the SBFD pattern is received via at least one of: a radio resource control message, a downlink control information message, a medium access control (MAC) control element message, or a combination thereof.

Aspect 4: The method of any of Aspects 1-3, wherein the information identifying the SBFD pattern includes at least one of: an SBFD type indicator, a selection of the SBFD pattern from a set of SBFD patterns, or a combination thereof.

Aspect 5: The method of any of Aspects 1-4, wherein whether the SBFD pattern is for the UE SBFD mode or the network node SBFD mode is based at least in part on a content of the SBFD pattern.

Aspect 6: The method of any of Aspects 1-5, wherein the indicator identifies, for the SBFD pattern, a first time period for the UE SBFD mode and a second time period for the network node SBFD mode.

Aspect 7: The method of Aspect 6, wherein the first time period and the second time period are associated with a granularity at a symbol level, a slot level, or a frame level.

Aspect 8: The method of any of Aspects 1-7, wherein the information identifying the SBFD pattern includes information selecting the SBFD pattern from a set of configured SBFD patterns or activating the SBFD pattern.

Aspect 9: The method of any of Aspects 1-8, wherein the information identifying the SBFD pattern includes first information, received via radio resource control signaling associated with providing a configuration, and second information received via medium access control (MAC) control element signaling or downlink control information signaling associated with providing a selection from the configuration or an update to the configuration.

Aspect 10: The method of any of Aspects 1-9, wherein the information identifying the SBFD pattern includes information identifying a mode associated with the SBFD pattern or information identifying a set of modes associated with a set of configured SBFD patterns.

Aspect 11: The method of any of Aspects 1-10, further comprising: transmitting a request message, wherein the request message indicates a request for using the UE SBFD mode or the network node SBFD mode; and wherein receiving the information identifying the SBFD pattern comprises: receiving at least a portion of the information identifying the SBFD pattern based at least in part on the request message.

Aspect 12: The method of Aspect 11, wherein the request message is based at least in part on at least one of: a UE traffic metric, a self-interference metric, a cross-link interference metric, a prediction, or a combination thereof.

Aspect 13: The method of any of Aspects 11-12, wherein the request message is conveyed via a medium access control (MAC) control element or uplink control information.

Aspect 14: The method of any of Aspects 11-13, wherein the request message includes information identifying a selection of an SBFD pattern.

Aspect 15: The method of any of Aspects 11-14, wherein the request message includes an indication of a first time duration for using the UE SBFD mode and a second time duration for using the network node SBFD mode.

Aspect 16: The method of Aspect 15, wherein the first time duration and the second time duration are associated with a granularity at a symbol level, a slot level, or a frame level.

Aspect 17: The method of any of Aspects 11-16, wherein the UE is configured to transmit an update to a mode for an SBFD symbol.

Aspect 18: The method of any of Aspects 11-17, wherein the request message includes information identifying a single configured SBFD pattern or information identifying an activated or selected SBFD pattern of a plurality of configured SBFD patterns.

Aspect 19: The method of any of Aspects 11-18, wherein the request message includes a bit indicator of a mode of the SBFD pattern.

Aspect 20: The method of any of Aspects 11-19, wherein the request message includes a set of bit indicators of a set of configured SBFD patterns.

Aspect 21: The method of any of Aspects 11-20, wherein the request message is conveyed via an uplink grant or an uplink grant request associated with a scheduling request.

Aspect 22: The method of any of Aspects 11-21, wherein the request message is conveyed with at least one other uplink message type.

Aspect 23: The method of Aspect 22, wherein a multiplexing priority is configured for the request message.

Aspect 24: The method of any of Aspects 1-23, further comprising: transmitting capability information identifying a capability associated with the UE SBFD mode and the network node SBFD mode, and wherein receiving the information identifying the SBFD pattern comprises: receiving at least a portion of the information identifying the SBFD pattern based at least in part on transmitting the capability information.

Aspect 25: The method of Aspect 24, wherein the capability information indicates at least one of: a capability for one of the UE SBFD mode or the network node SBFD mode, a capability for both the UE SBFD mode and the network node SBFD mode configured using different SBFD patterns, a capability for both the UE SBFD mode and the network node SBFD mode configured using a same SBFD pattern, a capability for both UE SBFD mode and the network node SBFD mode configured using a same SBFD pattern or using different SBFD patterns, a capability for dynamic switching between SBFD patterns, a capability for dynamic switching between SBFD modes, or a combination thereof.

Aspect 26: A method of wireless communication performed by a network node, comprising: transmitting, to a user equipment (UE), information identifying a sub-band full duplex (SBFD) pattern, wherein the information identifying the SBFD pattern includes an indicator of whether the SBFD pattern is for a UE SBFD mode or a network node SBFD mode; and communicating, with the UE, on one or more sub-bands in accordance with the SBFD pattern and the indicator of whether the SBFD pattern is for the UE SBFD mode or the network node SBFD mode.

Aspect 27: The method of Aspect 26, wherein the SBFD pattern is an SBFD time and frequency pattern.

Aspect 28: The method of any of Aspects 26-27, wherein the information identifying the SBFD pattern is received via at least one of: a radio resource control message, a downlink control information message, a medium access control (MAC) control element message, or a combination thereof.

Aspect 29: The method of any of Aspects 26-28, wherein the information identifying the SBFD pattern includes at least one of: an SBFD type indicator, a selection of the SBFD pattern from a set of SBFD patterns, or a combination thereof.

Aspect 30: The method of any of Aspects 26-29, wherein whether the SBFD pattern is for the UE SBFD mode or the network node SBFD mode is based at least in part on a content of the SBFD pattern.

Aspect 31: The method of any of Aspects 26-30, wherein the indicator identifies, for the SBFD pattern, a first time period for the UE SBFD mode and a second time period for the network node SBFD mode.

Aspect 32: The method of Aspect 31, wherein the first time period and the second time period are associated with a granularity at a symbol level, a slot level, or a frame level.

Aspect 33: The method of any of Aspects 26-32, wherein the information identifying the SBFD pattern includes information selecting the SBFD pattern from a set of configured SBFD patterns or activating the SBFD pattern.

Aspect 34: The method of any of Aspects 26-33, wherein the information identifying the SBFD pattern includes first information, transmitted via radio resource control signaling associated with providing a configuration, and second information transmitted via medium access control (MAC) control element signaling or downlink control information signaling associated with providing a selection from the configuration or an update to the configuration.

Aspect 35: The method of any of Aspects 26-34, wherein the information identifying the SBFD pattern includes information identifying a mode associated with the SBFD pattern or information identifying a set of modes associated with a set of configured SBFD patterns.

Aspect 36: The method of any of Aspects 26-35, further comprising: receiving a request message, wherein the request message indicates a request for using the UE SBFD mode or the network node SBFD mode; and wherein transmitting the information identifying the SBFD pattern comprises: transmitting at least a portion of the information identifying the SBFD pattern based at least in part on the request message.

Aspect 37: The method of Aspect 36, wherein the request message is based at least in part on at least one of: a UE traffic metric, a self-interference metric, a cross-link interference metric, a prediction, or a combination thereof.

Aspect 38: The method of any of Aspects 36-37, wherein the request message is conveyed via a medium access control (MAC) control element or uplink control information.

Aspect 39: The method of any of Aspects 36-38, wherein the request message includes information identifying a selection of an SBFD pattern.

Aspect 40: The method of any of Aspects 36-39, wherein the request message includes an indication of a first time duration for using the UE SBFD mode and a second time duration for using the network node SBFD mode.

Aspect 41: The method of Aspect 40, wherein the first time duration and the second time duration are associated with a granularity at a symbol level, a slot level, or a frame level.

Aspect 42: The method of any of Aspects 36-41, wherein the network node is configured to receive an update to a mode for an SBFD symbol.

Aspect 43: The method of any of Aspects 36-42, wherein the request message includes information identifying a single configured SBFD pattern or information identifying an activated or selected SBFD pattern of a plurality of configured SBFD patterns.

Aspect 44: The method of any of Aspects 36-43, wherein the request message includes a bit indicator of a mode of the SBFD pattern.

Aspect 45: The method of any of Aspects 36-44, wherein the request message includes a set of bit indicators of a set of configured SBFD patterns.

Aspect 46: The method of any of Aspects 36-45, wherein the request message is conveyed via an uplink grant or an uplink grant request associated with a scheduling request.

Aspect 47: The method of any of Aspects 36-46, wherein the request message is conveyed with at least one other uplink message type.

Aspect 48: The method of Aspect 47, wherein a multiplexing priority is configured for the request message.

Aspect 49: The method of any of Aspects 26-48, further comprising: receiving capability information identifying a capability associated with the UE SBFD mode and the network node SBFD mode, and wherein transmitting the information identifying the SBFD pattern comprises: transmitting at least a portion of the information identifying the SBFD pattern based at least in part on receiving the capability information.

Aspect 50: The method of Aspect 49, wherein the capability information indicates at least one of: a capability for one of the UE SBFD mode or the network node SBFD mode, a capability for both the UE SBFD mode and the network node SBFD mode configured using different SBFD patterns, a capability for both the UE SBFD mode and the network node SBFD mode configured using a same SBFD pattern, a capability for both UE SBFD mode and the network node SBFD mode configured using a same SBFD pattern or using different SBFD patterns, a capability for dynamic switching between SBFD patterns, a capability for dynamic switching between SBFD modes, or a combination thereof.

Aspect 51: An apparatus for wireless communication at a device, comprising a processor; memory coupled with the processor; and instructions stored in the memory and executable by the processor to cause the apparatus to perform the method of one or more of Aspects 1-50.

Aspect 52: A device for wireless communication, comprising a memory and one or more processors coupled to the memory, the one or more processors configured to perform the method of one or more of Aspects 1-50.

Aspect 53: An apparatus for wireless communication, comprising at least one means for performing the method of one or more of Aspects 1-50.

Aspect 54: A non-transitory computer-readable medium storing code for wireless communication, the code comprising instructions executable by a processor to perform the method of one or more of Aspects 1-50.

Aspect 55: A non-transitory computer-readable medium storing a set of instructions for wireless communication, the set of instructions comprising one or more instructions that, when executed by one or more processors of a device, cause the device to perform the method of one or more of Aspects 1-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, from a network node, information identifying a sub-band full duplex (SBFD) pattern, wherein the information identifying the SBFD pattern includes an indicator of whether the SBFD pattern is a first SBFD pattern for a UE SBFD mode or a second SBFD pattern for a network node SBFD mode; and
      communicate, with the network node, on one or more sub-bands in accordance with the SBFD pattern and the indicator of whether the SBFD pattern is the first SBFD pattern for the UE SBFD mode or the second SBFD pattern for the network node SBFD mode.

2. The UE of claim 1, wherein the SBFD pattern is an SBFD time and frequency pattern for one of the UE SBFD mode or the network node SBFD mode.

3. The UE of claim 1, wherein the information identifying the SBFD pattern is received via at least one of:
   a radio resource control message,
   a downlink control information message,
   a medium access control (MAC) control element message, or
   a combination thereof.

4. The UE of claim 1, wherein the information identifying the SBFD pattern includes at least one of:
   an SBFD type indicator,
   a selection of the SBFD pattern from a set of SBFD patterns, or
   a combination thereof.

5. The UE of claim 1,
wherein whether the SBFD pattern is for the UE SBFD mode or the network node SBFD mode is based at least in part on a content of the SBFD pattern.

6. The UE of claim 1,
wherein the indicator identifies, for the SBFD pattern, a first time period for the UE SBFD mode and a second time period for the network node SBFD mode.

7. The UE of claim 6,
wherein the first time period and the second time period are associated with a granularity at a symbol level, a slot level, or a frame level.

8. The UE of claim 1,
wherein the information identifying the SBFD pattern includes information selecting the SBFD pattern from a set of configured SBFD patterns or activating the SBFD pattern.

9. The UE of claim 1,
wherein the information identifying the SBFD pattern includes first information, received via radio resource control signaling associated with providing a configuration, and second information received via medium access control (MAC) control element signaling or downlink control information signaling associated with providing a selection from the configuration or an update to the configuration.

10. The UE of claim 1,
wherein the information identifying the SBFD pattern includes information identifying a mode associated with the SBFD pattern or information identifying a set of modes associated with a set of configured SBFD patterns.

11. The UE of claim 1,
wherein the one or more processors are further configured to:
  transmit a request message, wherein the request message indicates a request for using the UE SBFD mode or the network node SBFD mode; and
  wherein the one or more processors, to receive the information identifying the SBFD pattern, are configured to:
    receive at least a portion of the information identifying the SBFD pattern based at least in part on the request message.

12. The UE of claim 11,
wherein the request message is based at least in part on at least one of:
  a UE traffic metric,
  a self-interference metric,
  a cross-link interference metric,
  a prediction, or
  a combination thereof.

13. The UE of claim 11,
wherein the request message includes a set of bit indicators of a set of configured SBFD patterns.

14. The UE of claim 11,
wherein the request message is conveyed via an uplink grant or an uplink grant request associated with a scheduling request.

15. The UE of claim 11,
wherein the request message is conveyed with at least one other uplink message type.

16. The UE of claim 15,
wherein a multiplexing priority is configured for the request message.

17. The UE of claim 1,
wherein the one or more processors are further configured to:
  transmit capability information identifying a capability associated with the UE SBFD mode and the network node SBFD mode, and
  wherein the one or more processors, to receive the information identifying the SBFD pattern, are configured to:
    receive at least a portion of the information identifying the SBFD pattern based at least in part on transmitting the capability information.

18. The UE of claim 17,
wherein the capability information indicates at least one of:
  a capability for one of the UE SBFD mode or the network node SBFD mode,
  a capability for both the UE SBFD mode and the network node SBFD mode configured using different SBFD patterns,
  a capability for both the UE SBFD mode and the network node SBFD mode configured using a same SBFD pattern,
  a capability for both UE SBFD mode and the network node SBFD mode configured using a same SBFD pattern or using different SBFD patterns,
  a capability for dynamic switching between SBFD patterns,
  a capability for dynamic switching between SBFD modes, or
  a combination thereof.

19. A network node for wireless communication, comprising:
  a memory; and
  one or more processors, coupled to the memory, configured to:
    transmit, to a user equipment (UE), information identifying a sub-band full duplex (SBFD) pattern, wherein the information identifying the SBFD pattern includes an indicator of whether the SBFD pattern is a first SBFD pattern for a UE SBFD mode or a second SBFD pattern for a network node SBFD mode; and
    communicate, with the UE, on one or more sub-bands in accordance with the SBFD pattern and the indicator of whether the SBFD pattern is the first SBFD pattern for the UE SBFD mode or the second SBFD pattern for the network node SBFD mode.

20. The network node of claim 19,
wherein the SBFD pattern is an SBFD time and frequency pattern for one of the UE SBFD mode or the network node SBFD mode.

21. The network node of claim 19,
wherein the information identifying the SBFD pattern is received via at least one of:
  a radio resource control message,
  a downlink control information message,
  a medium access control (MAC) control element message, or
  a combination thereof.

22. The network node of claim 19,
wherein the information identifying the SBFD pattern includes at least one of:
  an SBFD type indicator,
  a selection of the SBFD pattern from a set of SBFD patterns, or
  a combination thereof.

23. The network node of claim 19, wherein whether the SBFD pattern is for the UE SBFD mode or the network node SBFD mode is based at least in part on a content of the SBFD pattern.

24. The network node of claim 19, wherein the indicator identifies, for the SBFD pattern, a first time period for the UE SBFD mode and a second time period for the network node SBFD mode.

25. The network node of claim 24, wherein the first time period and the second time period are associated with a granularity at a symbol level, a slot level, or a frame level.

26. The network node of claim 19, wherein the information identifying the SBFD pattern includes information selecting the SBFD pattern from a set of configured SBFD patterns or activating the SBFD pattern.

27. The network node of claim 19, wherein the information identifying the SBFD pattern includes first information, transmitted via radio resource control signaling associated with providing a configuration, and second information transmitted via medium access control (MAC) control element signaling or downlink control information signaling associated with providing a selection from the configuration or an update to the configuration.

28. The network node of claim 19, wherein the information identifying the SBFD pattern includes information identifying a mode associated with the SBFD pattern or information identifying a set of modes associated with a set of configured SBFD patterns.

29. A method of wireless communication performed by a user equipment (UE), comprising:

receiving, from a network node, information identifying a sub-band full duplex (SBFD) pattern, wherein the information identifying the SBFD pattern includes an indicator of whether the SBFD pattern is a first SBFD pattern for a UE SBFD mode or a second SBFD pattern for a network node SBFD mode; and communicating, with the network node, on one or more sub-bands in accordance with the SBFD pattern and the indicator of whether the SBFD pattern is the first SBFD pattern for the UE SBFD mode or the second SBFD pattern for the network node SBFD mode.

30. A method of wireless communication performed by a network node, comprising:

transmitting, to a user equipment (UE), information identifying a sub-band full duplex (SBFD) pattern, wherein the information identifying the SBFD pattern includes an indicator of whether the SBFD pattern is a first SBFD pattern for a UE SBFD mode or a second SBFD pattern a network node SBFD mode; and communicating, with the UE, on one or more sub-bands in accordance with the SBFD pattern and the indicator of whether the SBFD pattern is the first SBFD pattern for the UE SBFD mode or the second SBFD pattern for the network node SBFD mode.

* * * * *